June 14, 1955    M. GAUL    2,710,791
METHOD OF MAKING CORRUGATED TUBES
Filed Feb. 25, 1953
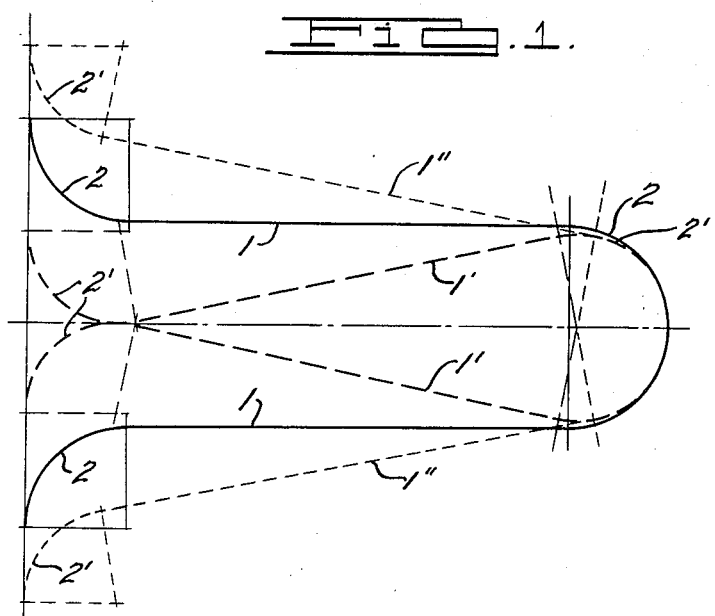
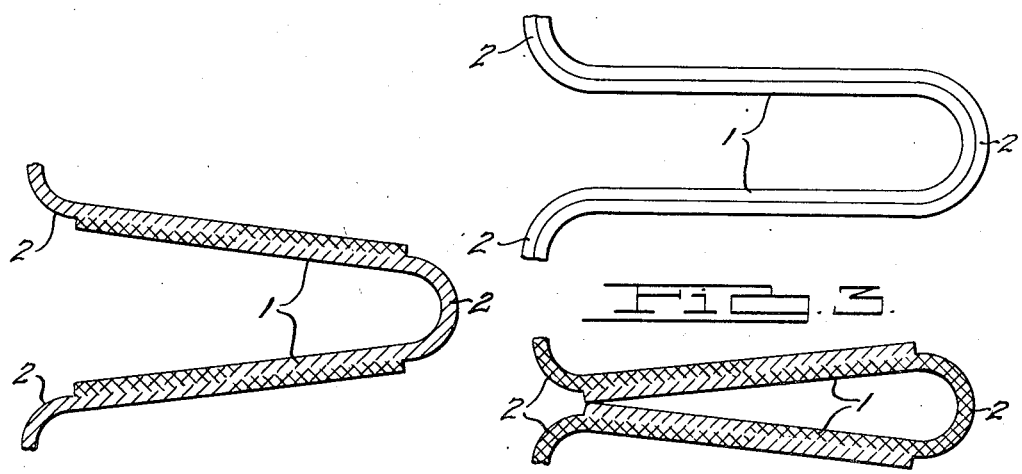
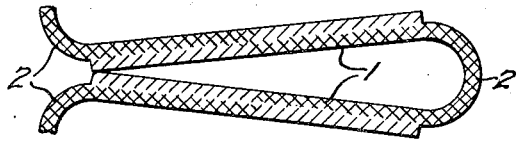
INVENTOR.
Max Gaul.
BY
Harness, Dickey & Pierce
ATTORNEYS.

United States Patent Office 2,710,791
Patented June 14, 1955

2,710,791

METHOD OF MAKING CORRUGATED TUBES

Max Gaul, Eppstein (Taunus), Germany, assignor to Hans Sickinger, Providence, R. I.

Application February 25, 1953, Serial No. 338,827

3 Claims. (Cl. 41—42)

This invention relates to corrugated tubes or pipes consisting preferably of tombac and to be used among other things for the manufacture of thermo-regulating elements contained in thermostats.

It is known that such corrugated tubes have hitherto been manufactured of thin-walled smooth tubes or pipes either by a rolling operation or by impressing the corrugation both externally and internally or by forming the smooth tube by hydraulic means. The latter tube may for instance have a diameter of 1.5 in. and a wall thickness of 0.0079 in.; after the forming operation, i. e., after it has been corrugated, it will possess an external diameter of 1.65 in. and an internal diameter of 1.1 in. with a wave depth of 0.28 in., a wave thickness of 0.055 in. and a distance between two successive waves of 0.04 in. Although such a corrugated tube will in general be used to act as a spring, it is in effect no genuine spring in that it does not return from its tensioned state completely into its former original state. This is because the material will approximate the yield point with each expanding motion of the corrugated tube, the inference being that the useful life of a corrugated tube is rather limited as against the practically unlimited life of a normal spring. It is however impossible to give a corrugated tube the specific properties of a real spring, since the former neither possesses nor can be given the necessary prerequisites of a spring required to produce a genuine spring action. To achieve this, very deep and numerous waves would be required, which may however be considered impracticable on account of manufacturing and assembling difficulties as well as of the prohibitive costs involved.

The present invention represents a distinct improvement in the direction of achieving a superior spring action of the various waves of a corrugated tube in that it departs from the principle of spring action.

The appended drawings illustrate the theory on which this invention is based, as well as an execution of the invention.

Figure 1 is a schematic diagram illustrating the theory relating to the changing of form of a corrugated tube;

Figure 2 is a cross-section of the various waves of a corrugated tube being free from tension; and Figures 3 and 4 show the said corrugated tube under varying degrees of stress, with the hatched portions being subjected to a tensile stress and the cross-hatched portions being subjected to a compressive stress.

In Figure 1, the corrugated tube exhibits in its unstressed condition, as it exists after its manufacture, a series of parallel annular web areas 1, which under stress will assume the slanting or inclined position 1' or 1". These latter distinguish themselves only by the change of compression and tension in the portions subjected to stress. As the annular areas 1, even under stress, will not and cannot experience a change in their respective radii, that is, their distance from the central axis, the inclined areas 1' and 1" could appear in theory as hypotenuses, against the parallel areas 1 as catheti only if the arcs 2 of the waves are deformed, as is illustrated under 2'. The diameter of the arcs 2 will then decrease, and portions of the arcs will become a part of the annular area 1, which by the lengthening of one cathetus may be transformed into a hypotenuse.

This leads to the realization that an elastic forming property of a corrugated tube during its operation will be substantially required only of the arcs, so that any attempt at improvement should be confined to those portions. Though corrugated tubes with thinner walls than is the present custom would appear to be better suited for many purposes, the smooth tube could no longer be safely drawn if the wall thickness were reduced still further, since the strength of the material would be exceeded by the stress imposed on it by the drawing process, so that fracture would inevitably result. It therefore becomes necessary to vary the wall thickness of the finished corrugated tube, i. e., to diminish the thickness of the aforesaid arcs as against that of the annular areas, since the former should preferably be elastic while rigidity would be of advantage to the latter.

The manufacture of such varying and diminished wall thicknesses in corrugated tubes is the principal object of the present invention. To achieve this end of the invention, mechanical, chemical, and electrochemical methods may be used. Experience has shown however that mechanical methods, e. g. the rolling process, are less suited than the two former methods to which the following examples will be confined in illustration of the invention. For the sake of lucidity, certain theoretical statements will be premised which are supported by Figures 2 to 4.

Accordingly, there are no stresses whatsoever which act upon the corrugated tube in its finished condition (Figure 2). Upon compression of the corrugated tube in an axial direction (Figure 3) tensile stresses will be produced in the external portions of arcs 2 (not shown for reasons described below) and compressive stresses in the internal portions of the arcs shown by cross-hatching. According to traditional belief there is a neutral line or zone halfway between these zones of stress. Conversely, by stretching the corrugated tube, Figure 4, compressive stresses will be produced in the external portions of the arcs (not shown), the inference being that when using the corrugated tube as an element in a thermostat, an alternation of stress will occur which will make very severe demands upon the material with regard to durability and wearing resistance. When thus departing from the fact that a spring of low rate may be submitted to a greater specific deflection than a spring with a higher rate, the arcs as the only elastic elements of the present corrugated tube must be designed thinner than has so far been customary and feasible.

According to the nature of this invention, the wall thickness of the arcs 2 will thus be diminished. Obviously, the rolling process is for various self-evident reasons hardly suitable to achieve this end. A chemical method will lend itself much easier to this purpose. Accordingly, through the application of a mixture of inorganic acids, a disintegration which is easily controlled as to quantity will be produced. When reaching a predetermined decrease of wall thickness, this dissolving process will then be interrupted at the desired point. Experience has shown that a decrease of thickness through chemical methods offers entirely satisfactory accuracy and uniformity and will not result in any disadvantage in the mechanical function of the corrugated tube. The said mixture of acids consists preferably of sulphuric acid, nitric acid, with an admixture of sodium bichromate.

To confine the said disintegration to the arcs 2 of the corrugated tube, a simple method is suggested by which the corrugated tube prior to its immersion in the solution is compressed to such an extent that the various waves are brought into close touch with each other. In this fashion, the annular web areas 1 (see Figure 3) will be inaccessibly sealed against the outside, so that the aforesaid acids will be able to act only upon the arcs 2. The outer portions of the latter, that is the portions being removed by the acid, are not shown in Figure 3 but are at this point in a tensile state. A remarkable phenomenon thus will be noted, which is that the corrugated tube upon removal of stress will no longer return to its original state, Figure 2, but tends to approximate the state illustrated in Figure 4. It will then be observed that the originally stable condition, Figure 2, becomes an unstable one, while the boundary conditions, Figures 3 and 4, assume a stable character. These vary, however, in degree in that the boundary condition of Figure 3 is inferior to the condition of Figure 4 as regards the intensity. One may consequently speak of an orthostable or metastable state, respectively. Accordingly, the corrugated tube will upon removal of outer influences temporarily return to the state of Figure 4, while under the influence of only very slight outer forces directed at compressing the corrugated tube it will, in omission of the meanwhile unstable state of Figure 2, at once pass over into the border state of Figure 3. This phenomenon is in its effect comparable to the characteristics of the well known flat oil cans (as used for bicycles and sewing machines) whose round flat-bellied lateral parts may be audibly pressed in in a similar manner as is the case with the object of this invention. The theoretical explanation in regard of the corrugated tube is that the original state characterized by balanced stresses, i. e. the stable or stress-relieved state, cannot be restored if the stresses become unbalanced, in that one of the zones of stress, in the present example the zone exposed to tensile stress, is removed. It therefore follows that through the removal of a metal layer under stress, while leaving neighboring layers under varying degrees of stress, a phenomenon like the one described above can be brought about.

Another manner of execution of this invention is that the purely chemical method of removing metal is replaced by an electrochemical process. Through the latter method, the removal of metal may be substantially confined to the arcs 2 even without compressing the corrugated tubes to be thus treated. While certain precautions will of course have to be observed, the entire reaction, particularly in a quantitive respect, may be better controlled by the operator.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A method for the manufacture of corrugated tubes including the steps of compressing the corrugated tube so as to subject the external portions of the corrugated tube arcs to tensile stress, and decreasing only the wall thickness of said arcs by removing said external portions by a disintegrating chemical action.

2. A method for the manufacture of corrugated tubes including the steps of compressing the corrugated tube until adjacent corrugations thereof are in contact with each other, and reducing only the wall thickness of the corrugated tube arcs by removing the portions thereof which are then under tensile stress by a disintegrating chemical action.

3. A method for the manufacture of corrugated tubes including the steps of compressing the corrugated tube until adjacent corrugations thereof are in contact so as to seal off the inner surfaces thereof, and reducing only the portions of the arcs of said corrugations which are then under tension by subjecting the exposed surfaces thereof to a disintegrating chemical action.

References Cited in the file of this patent

UNITED STATES PATENTS

| 1,017,671 | Jenkins | Feb. 20, 1912 |
| 1,095,100 | Fulton | Apr. 28, 1914 |
| 1,523,951 | Fulton | Jan. 20, 1925 |
| 1,644,823 | Fay | Oct. 11, 1927 |

FOREIGN PATENTS

| 139,164 | Germany | May 24, 1901 |